(12) United States Patent
Liu

(10) Patent No.: US 8,104,989 B2
(45) Date of Patent: Jan. 31, 2012

(54) RETAINING STRUCTURE

(75) Inventor: Min-Sheng Liu, Dongguan (CN)

(73) Assignees: Min-Sheng Liu, Dongguan, Guangdong (CN); Lei Cao, Dongguan, Guangdong (CN); Yu-Chi Liu, Dongguan, Guangdong (CN); Ching-Ho Ku, Dongguan, Guangdong (CN)

( * ) Notice: Subject to any disclaimer, the term of this patent is extended or adjusted under 35 U.S.C. 154(b) by 72 days.

(21) Appl. No.: 12/575,628

(22) Filed: Oct. 8, 2009

(65) Prior Publication Data

US 2011/0085853 A1    Apr. 14, 2011

(51) Int. Cl.
*F16B 7/00* (2006.01)
(52) U.S. Cl. ........................ 403/298; 403/353
(58) Field of Classification Search .................. 403/298, 403/353, 401
See application file for complete search history.

(56) References Cited

U.S. PATENT DOCUMENTS 2,702,926 A * 3/1955 Rahaim .......................... 403/298
5,131,783 A * 7/1992 Astl .............................. 403/298

* cited by examiner

*Primary Examiner* — Victor MacArthur
(74) *Attorney, Agent, or Firm* — Alan Kamrath; Kamrath IP Lawfirm, PA

(57) ABSTRACT

A retaining structure is used to retain a wooden first part and a wooden second part together and includes a retainer fitted to a recess of the first part, and a fastening member to be engaged to the second part. The fastening member has a plurality of wings formed on two sides of an acting end thereof. A number of recessed portions is mounted between front and rear sides of the fastening member and spaced apart from each other, and the fastening member further includes a plurality of raised portions. The recessed and raised portions are arranged longitudinally or horizontally between the front and rear sides of the acting end of the fastening member.

10 Claims, 17 Drawing Sheets

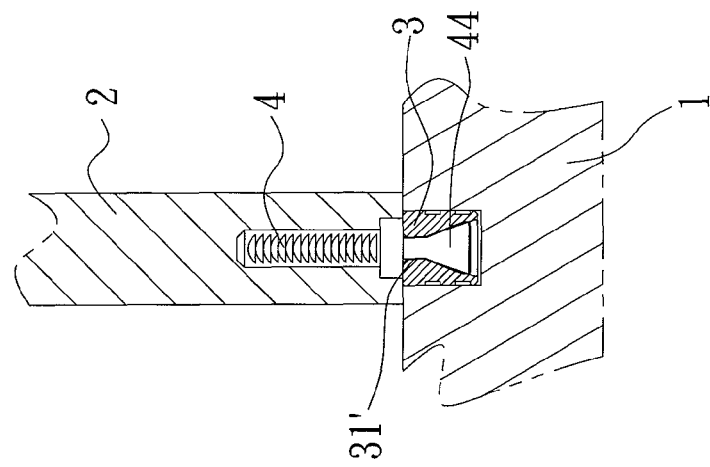
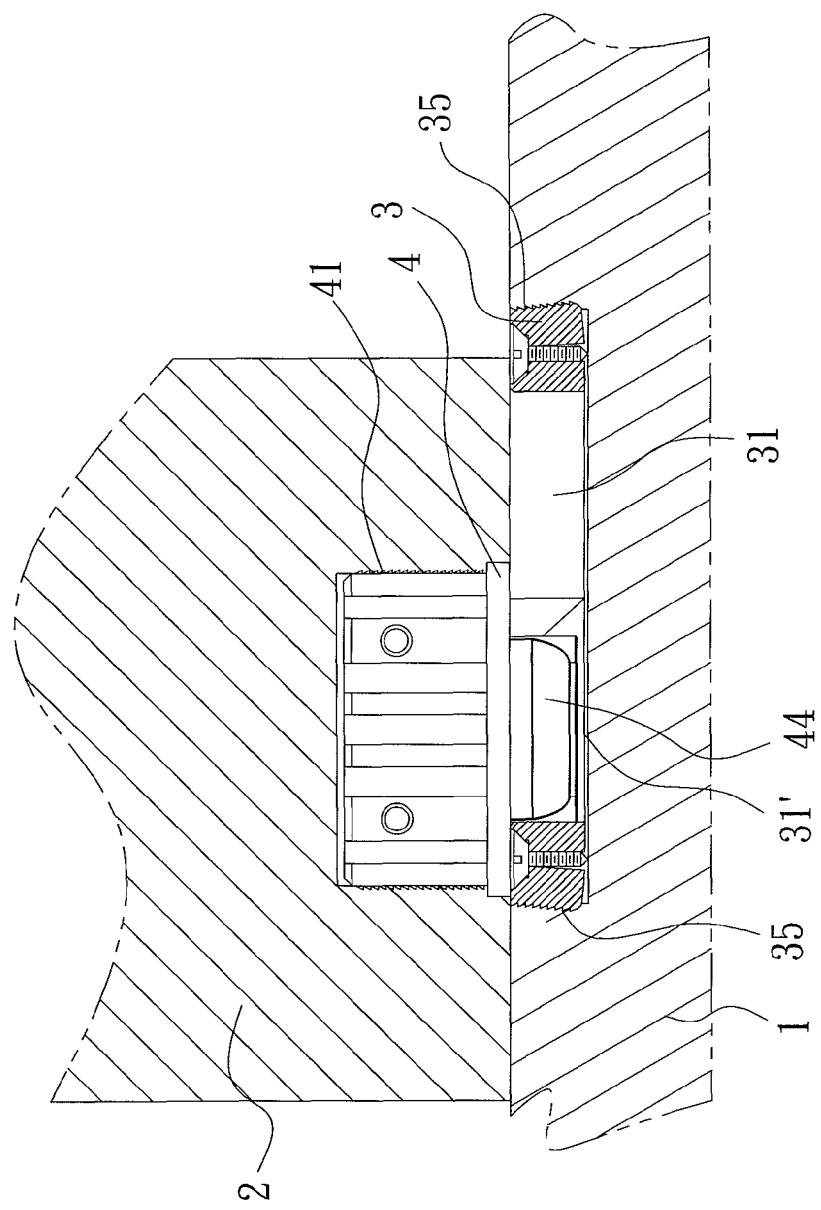
FIG. 6
FIG. 7

RETAINING STRUCTURE

BACKGROUND OF THE INVENTION

1. Field of the Invention

The present invention relates to a retaining structure so that related parts of furniture and cabinets are fastened securely by using a retainer and a fastening member.

2. Description of the Prior Art

Related parts of convention wooden furniture or cabinets are fastened together by using different retaining methods. It is to be noted that a tenon is used to retain two adjacent parts together. Alternately, a recessed portion is formed on a wooden first part, and a raised portion is arranged on a wooden second part so as to be engaged with each other. However, such fastening methods can not retain related parts securely.

The present invention has arisen to mitigate and/or obviate the afore-described disadvantages.

SUMMARY OF THE INVENTION

The primary object of the present invention is to provide a retaining structure so that related parts of furniture and cabinets are fastened securely.

A further object of the present invention is to provide a retaining structure so that the recessed and raised portions are arranged longitudinally or horizontally between the front and rear sides of the acting end of the fastening member.

Another object of the present invention is to provide a retaining structure so that the fastening member has a plurality of wings formed on two sides of an acting end thereof to engage with an inner wall of the second part.

A retaining structure in accordance with the present invention is used to retain a wooden first part with a wooden second part and comprises a retainer fitted to a recess of the first part. Then, the retainer is fixed by using screw elements. The retaining structure comprises a fastening member to be engaged with the second part having a support extending outward from the fastening member to be retained to a notch of the retainer, thereby assembling the first and the second parts together. The improvement of the retaining structure includes:

the fastening member having a plurality of wings formed on two sides of an acting end thereof to engage with an inner wall of the second part, a number of recessed portions mounted between front and rear sides thereof and spaced apart from each other, and a plurality of raised portions, each proximate to the recessed portions. The recessed and raised portions are arranged longitudinally or horizontally between the front and rear sides of the acting end of the fastening member, and the retainer has a number of ribs fixed on two sides thereof so as to be retained to the first part.

BRIEF DESCRIPTION OF THE DRAWINGS

FIG. 6 is also another cross sectional view showing the operation of the retaining structure according to the first embodiment of the present invention;

FIG. 7 is also another cross sectional view showing the operation of the retaining structure according to the first embodiment of the present invention;

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 3:
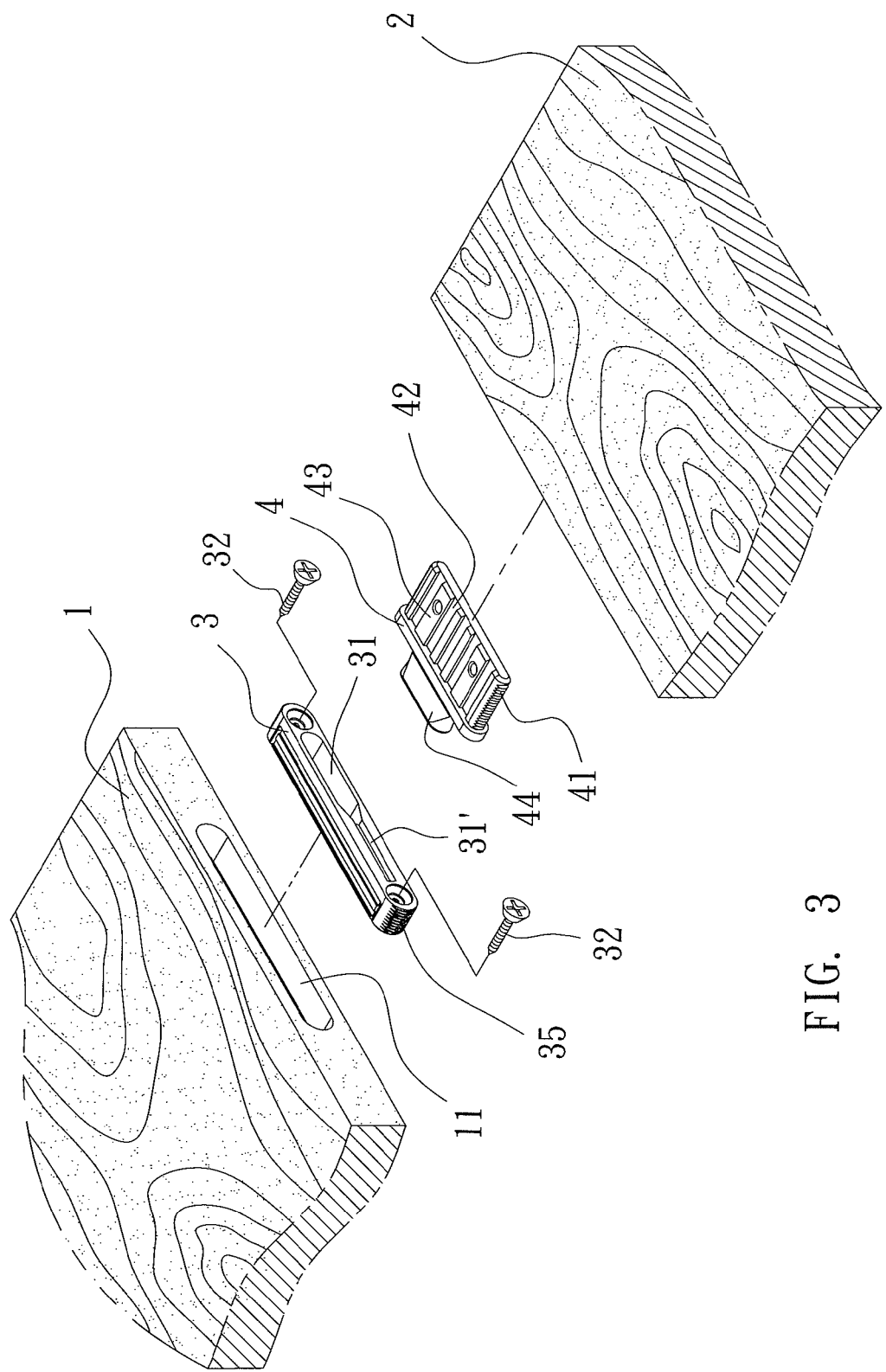
FIG. 3 is a perspective view showing the exploded components of the retaining structure according to the first embodiment of the present invention.
Figure 4:
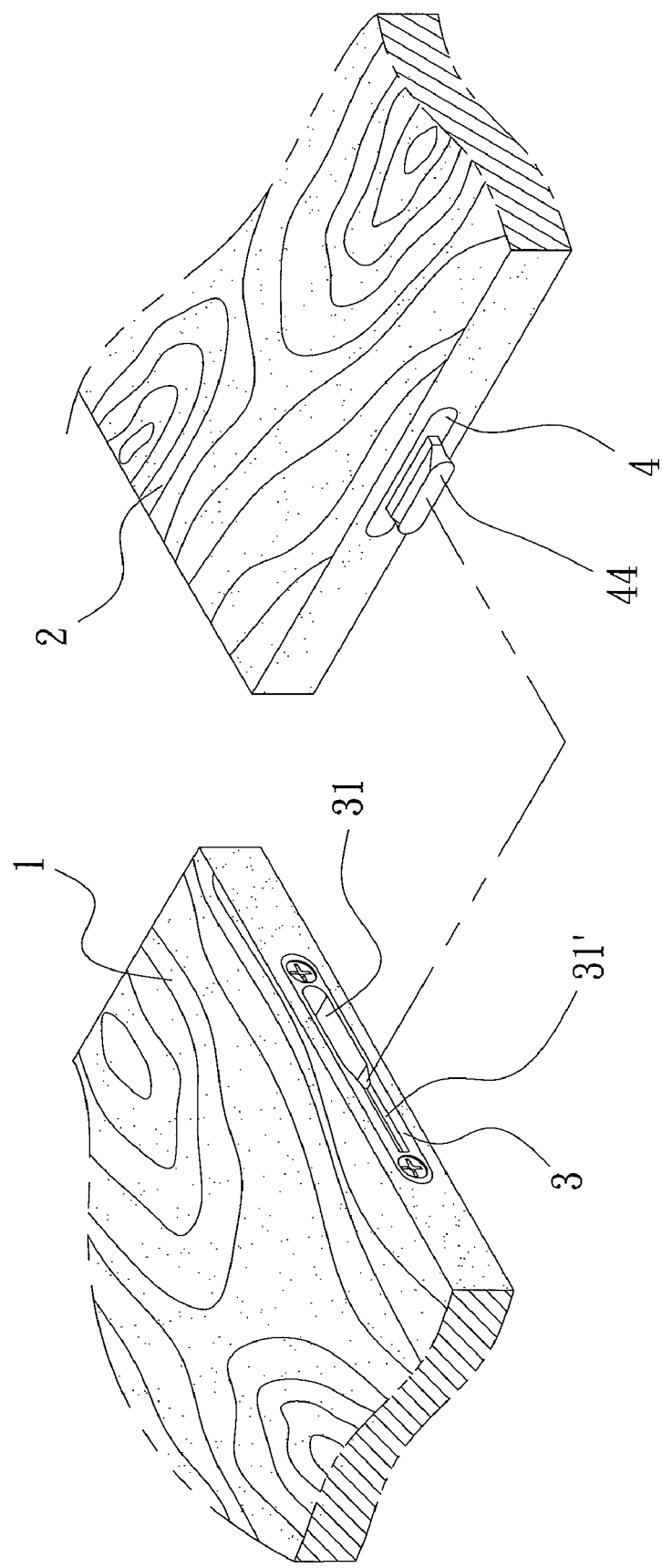
FIG. 4 is a perspective view showing a retainer being fitted to a first part and a fastening member being fitted to a second part.
Figure 4A:
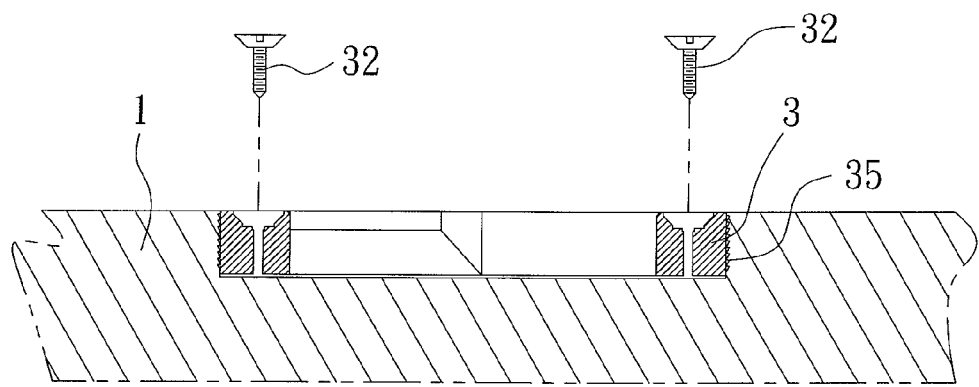
FIG. 4A is a cross sectional view showing the operation of the retaining structure according to the first embodiment of the present invention.
Figure 4B:
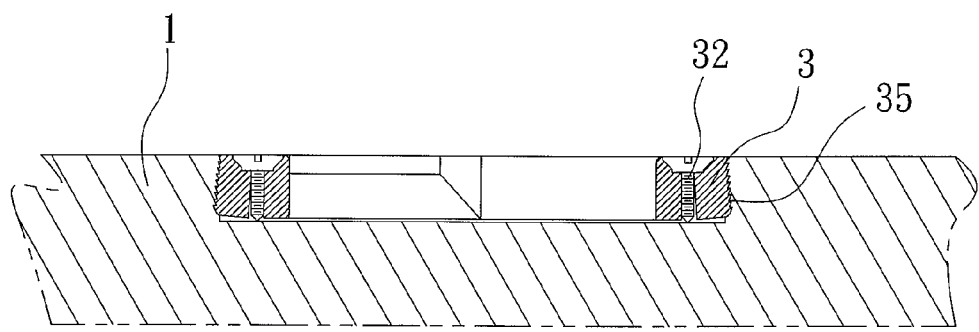
FIG. 4B is another cross sectional view showing the operation of the retaining structure according to the first embodiment of the present invention.

Referring to FIGS. 3-4, a retaining structure in accordance with a first embodiment of the present invention is used to retain a wooden first part 1 and a wooden second part 2 together. The retaining structure includes a retainer 3 fitted to a recess 11 of the first part 1, and, then, the retainer 3 is fixed by using screw elements 32, as shown in FIGS. 4A and 4B. The retaining structure further includes a fastening member 4 to be engaged with the second part 2 having a support 44 extending outward from the fastening member 4 so as to be retained to a notch 31 of the retainer 3, thereby assembling the first and the second parts 1, 2 together.

Figure 1:
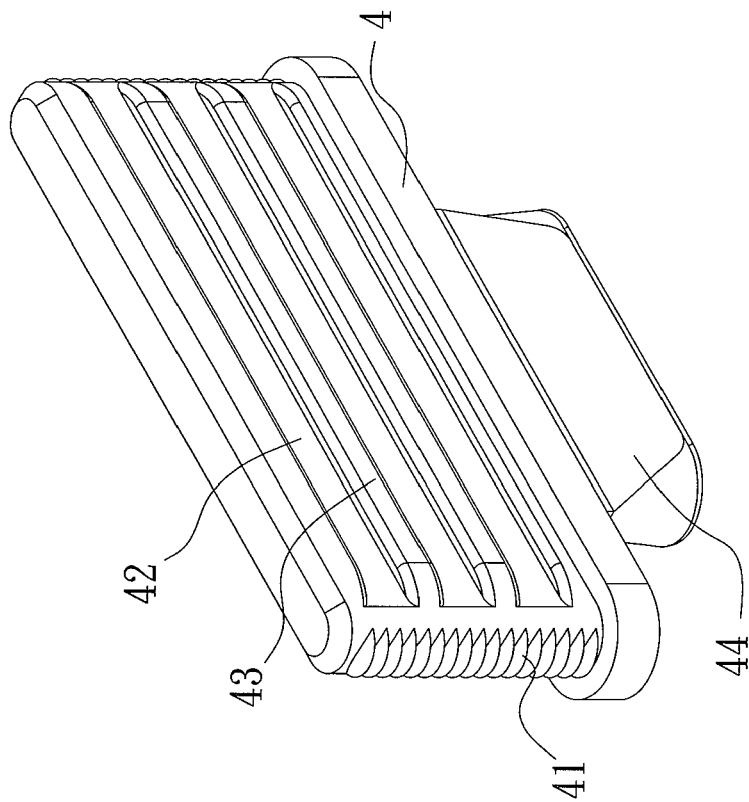
FIG. 1 is a perspective view showing the assembly of a retaining structure according to a first embodiment of the present invention.
Figure 2:
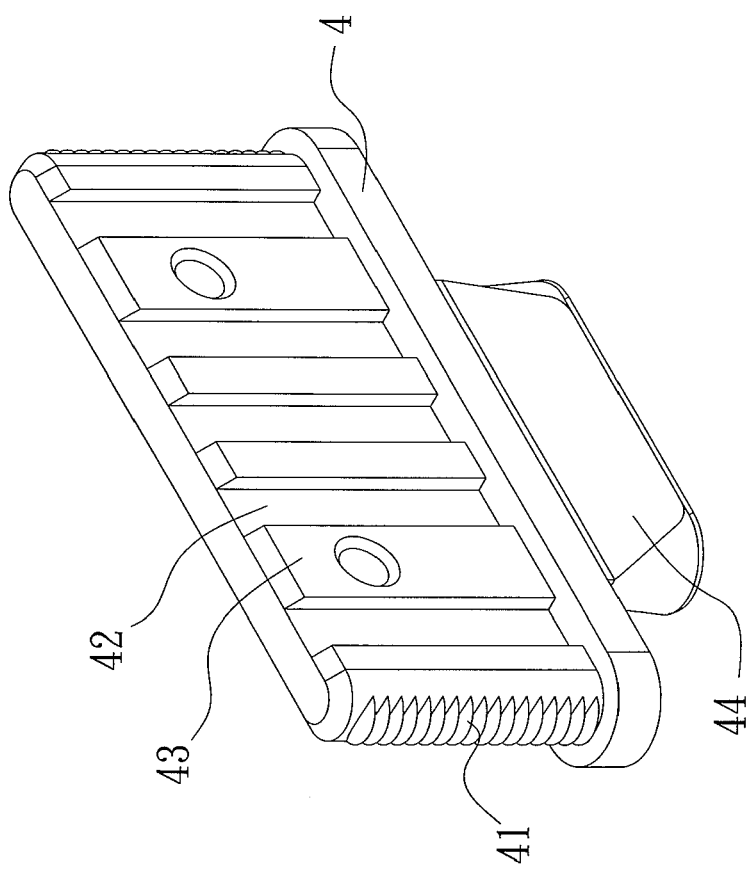
FIG. 2 is another perspective view showing the assembly of the retaining structure according to the first embodiment of the present invention.

The fastening member 4 (as illustrated in FIGS. 1 and 2) has a plurality of wings 41 formed on two sides of an acting end thereof to engage with an inner wall of the second part 2, a number of recessed portions 42 mounted between front and rear sides thereof and spaced apart from each other, and a plurality of raised portions 43, each proximate to the recessed portions 42. The recessed and raised portions 42, 43 are arranged longitudinally (as shown in FIG. 1) or horizontally (as illustrated in FIG. 2) between the front and rear sides of the acting end of the fastening member 4, and the retainer 3 has a number of ribs 35 fixed on two sides thereof so as to be retained to the first part 1 (as shown in FIG. 4B).

Figure 5:
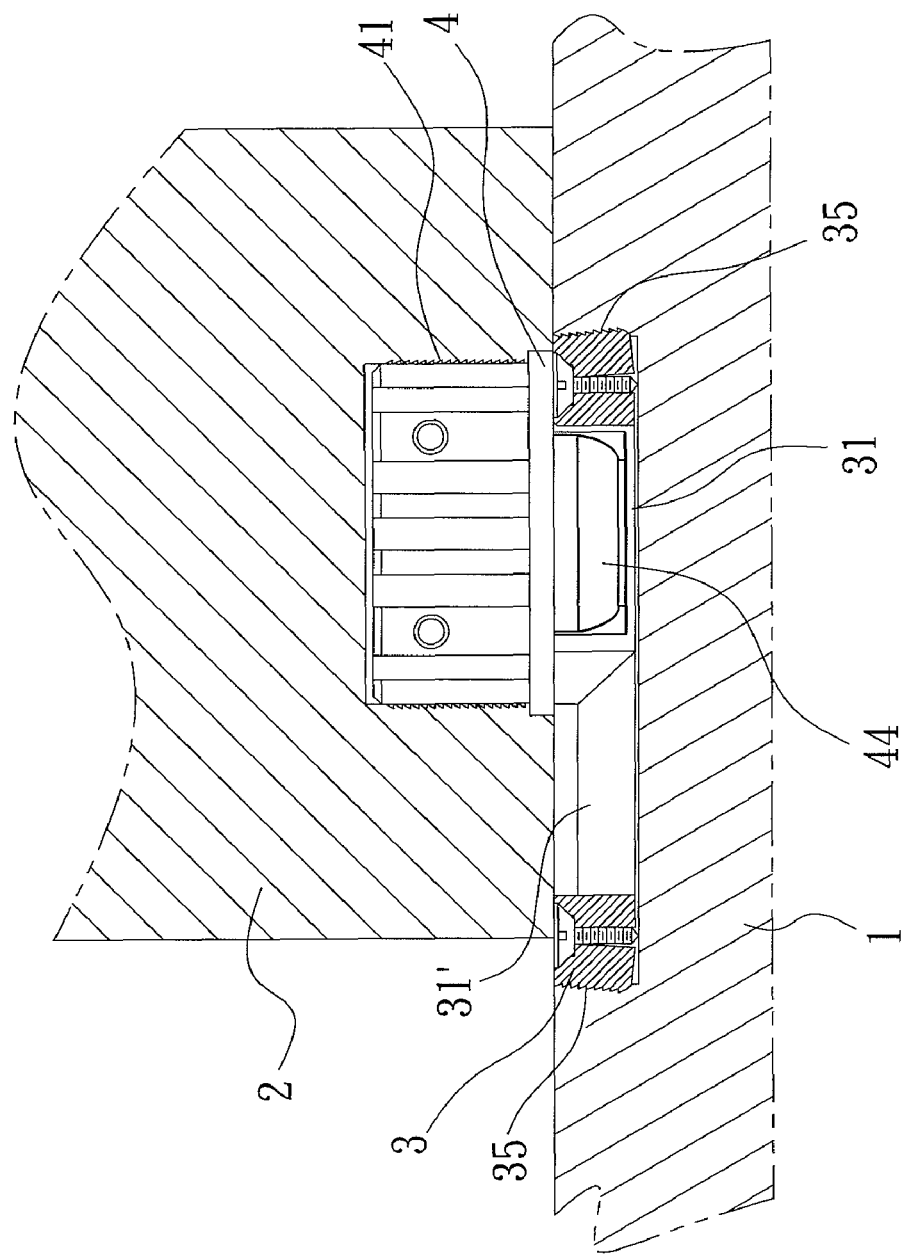
FIG. 5 is further another cross sectional view showing the operation of the retaining structure according to the first embodiment of the present invention.

In operation, as illustrated in FIG. 5, the wings 41, the recessed portions 42, and the raised portions 43 of the fastening member 4 are retained to the second part 2. Thereafter, the support 44 of the fastening member 4 is fitted to the notch 31 of the retainer 3 (as illustrated in FIG. 5). Then, the second part 2 is pushed to a narrow slot 31' of the retainer 3 (as illustrated in FIG. 6) so that the support 44 of the fastening member 4 is retained in the slot 31' of the retainer 3 (as shown in FIG. 7). Thus, related parts of wooden furniture or cabinets are fastened securely.

Figure 8:
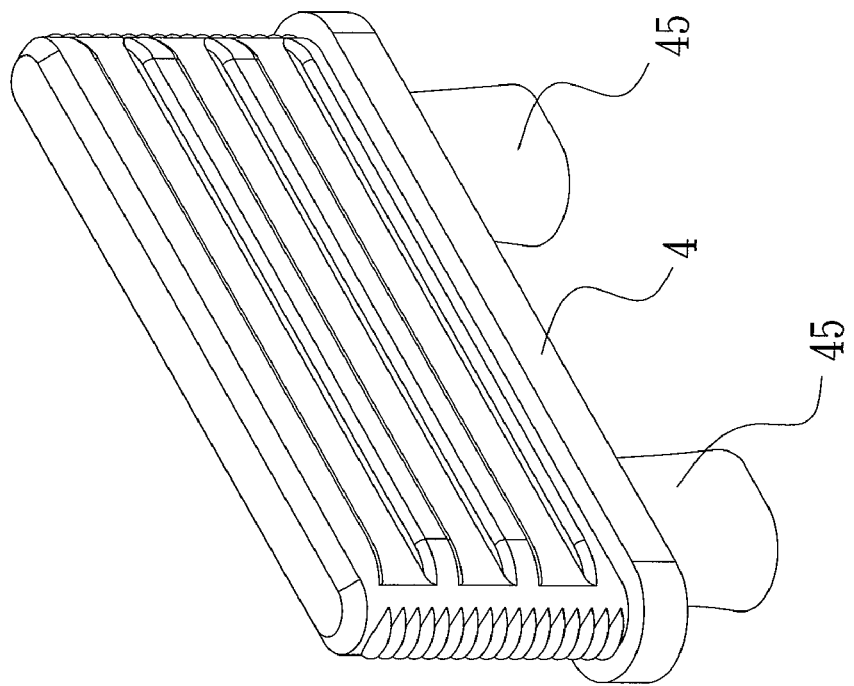
FIG. 8 is a perspective view showing the assembly of a retaining structure according to a second embodiment of the present invention.
Figure 9:
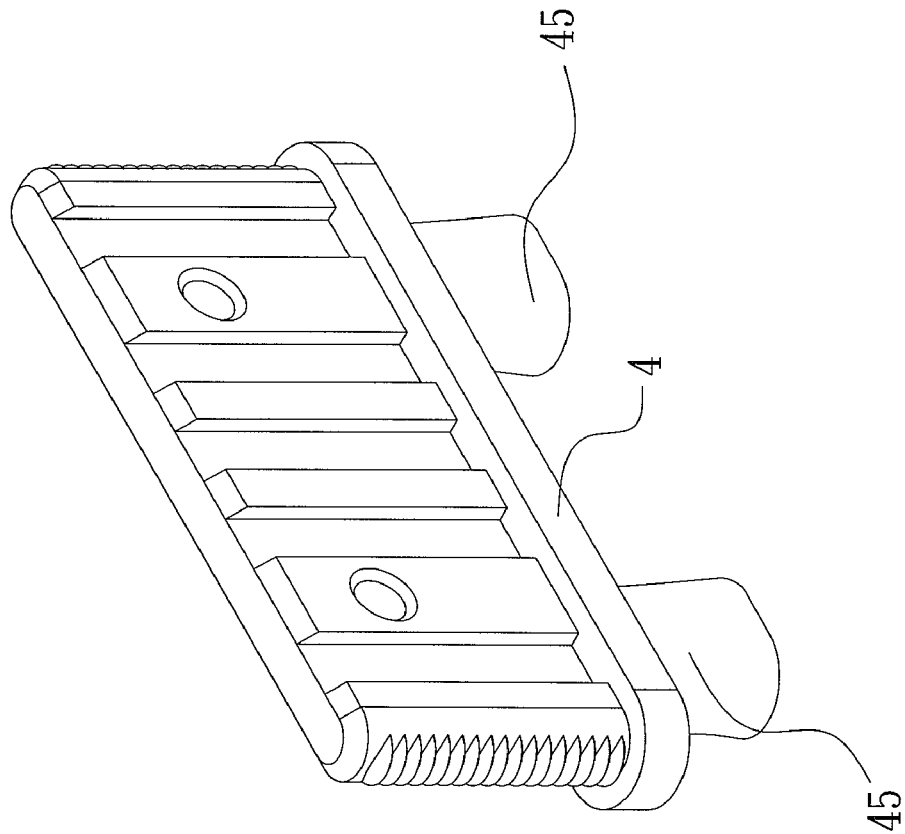
FIG. 9 is another perspective view showing the assembly of the retaining structure according to the second embodiment of the present invention.
Figure 10:
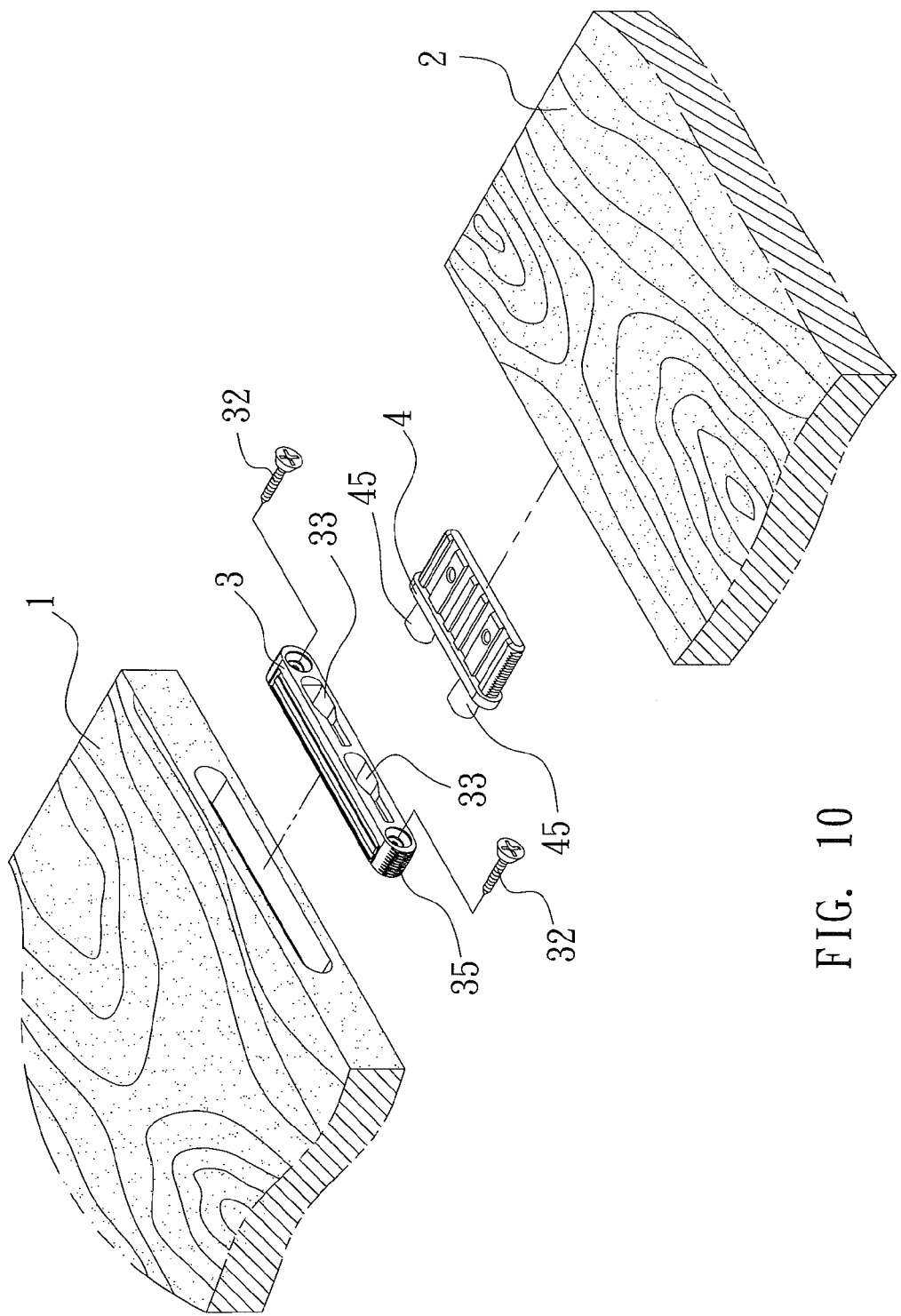
FIG. 10 is a perspective view showing the exploded components of the retaining structure according to the second embodiment of the present invention.

The fastening member 4 according to a second embodiment of the present invention is retained to two grooves 33 of the retainer 3 (as shown in FIG. 10) and includes two supports 45 extending outward therefrom (as shown in FIGS. 8 and 9) and having a distance between the two supports 45.

Figure 11:
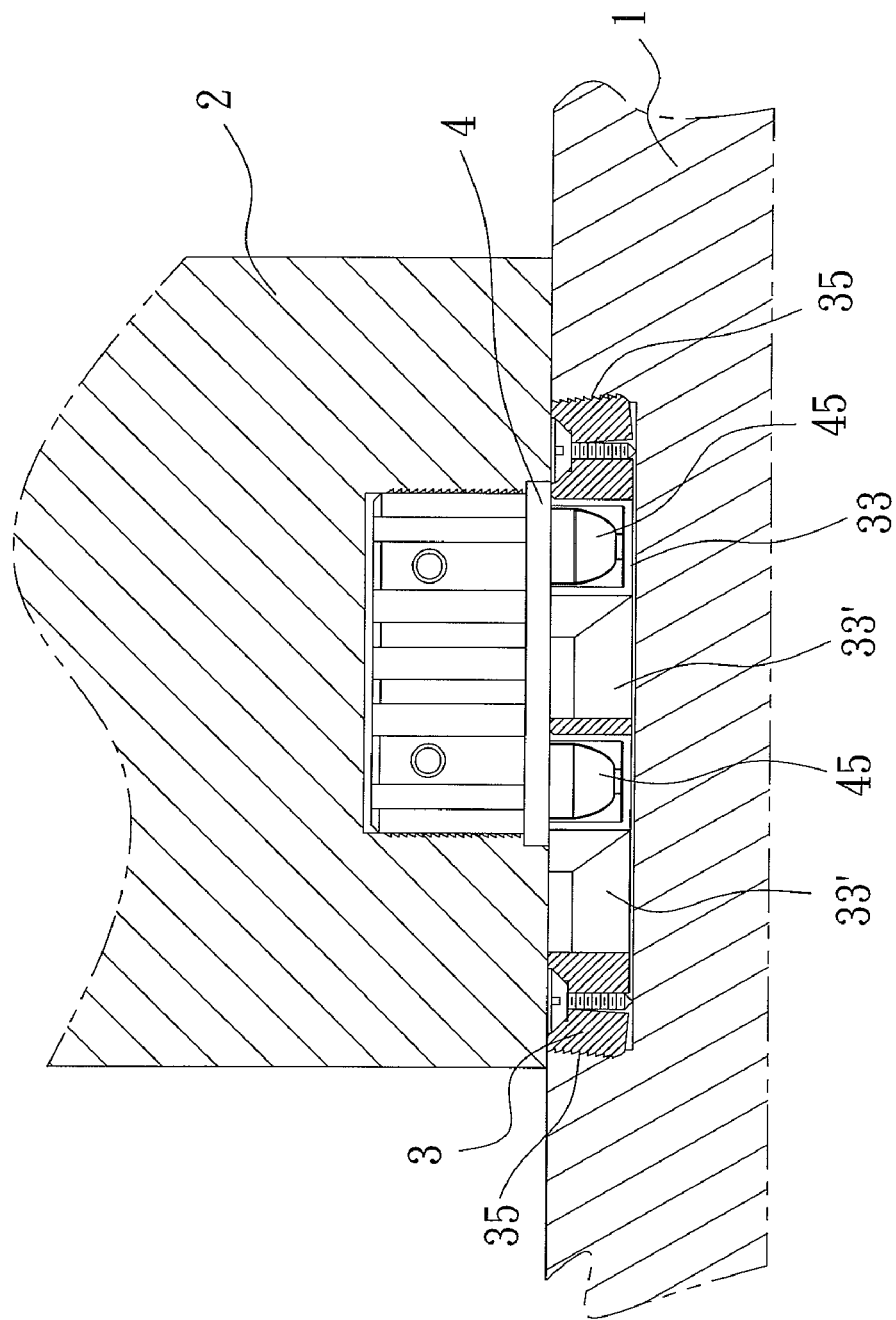
FIG. 11 is a cross sectional view showing the operation of the retaining structure according to the second embodiment of the present invention.
Figure 12:
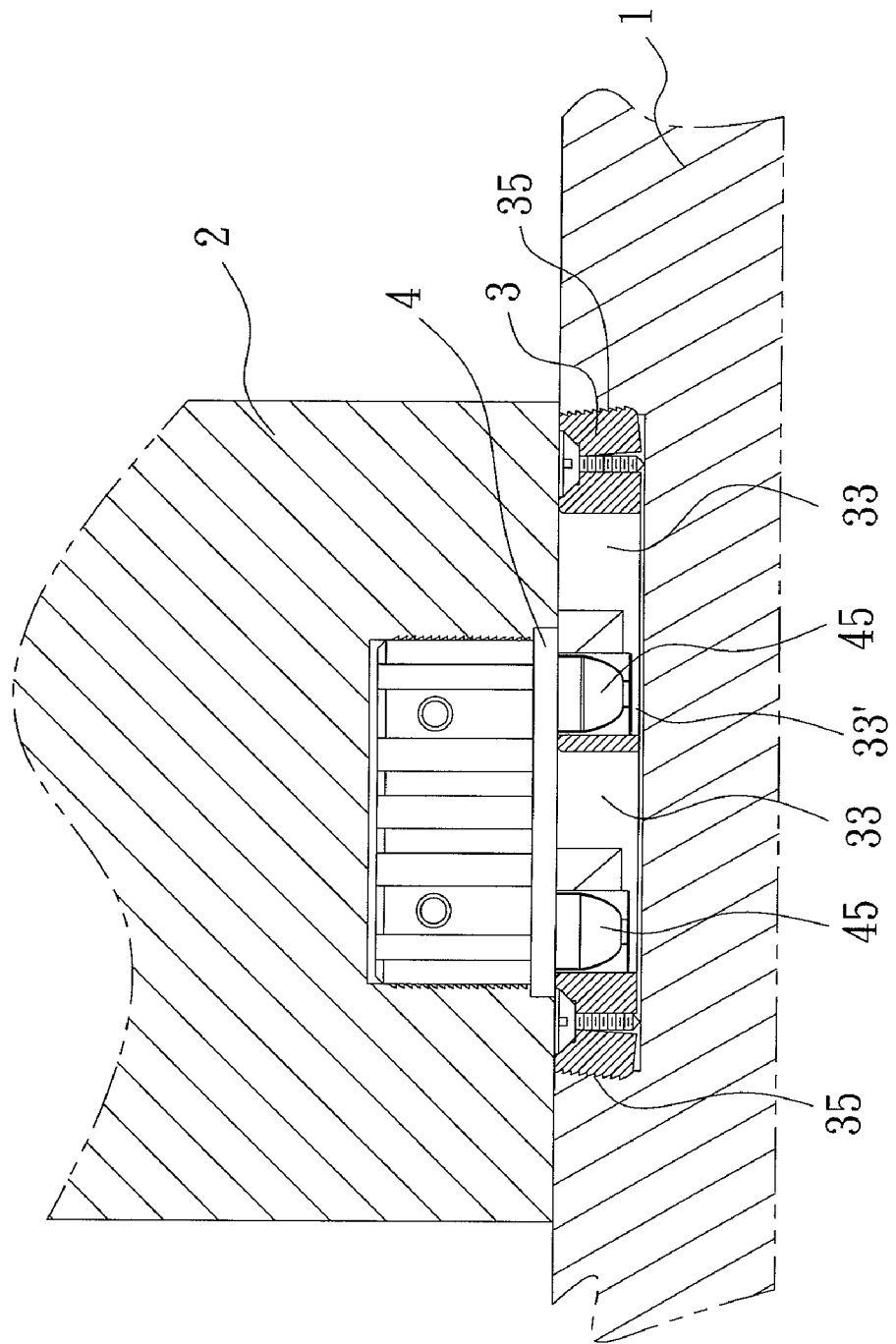
FIG. 12 is another cross sectional view showing the operation of the retaining structure according to the second embodiment of the present invention.

In operation, the acting end of the fastening member 4 is fastened to the second parts 2 (as illustrated in FIG. 11), and the supports 45 of the fastening member 4 are fitted to the grooves 33 of the retainer 3. Thereafter, the second part 2 is pushed to troughs 33' (as illustrated in FIG. 12) so that the supports 45 of the fastening member 4 are retained in the troughs 33' securely.

Figure 14:
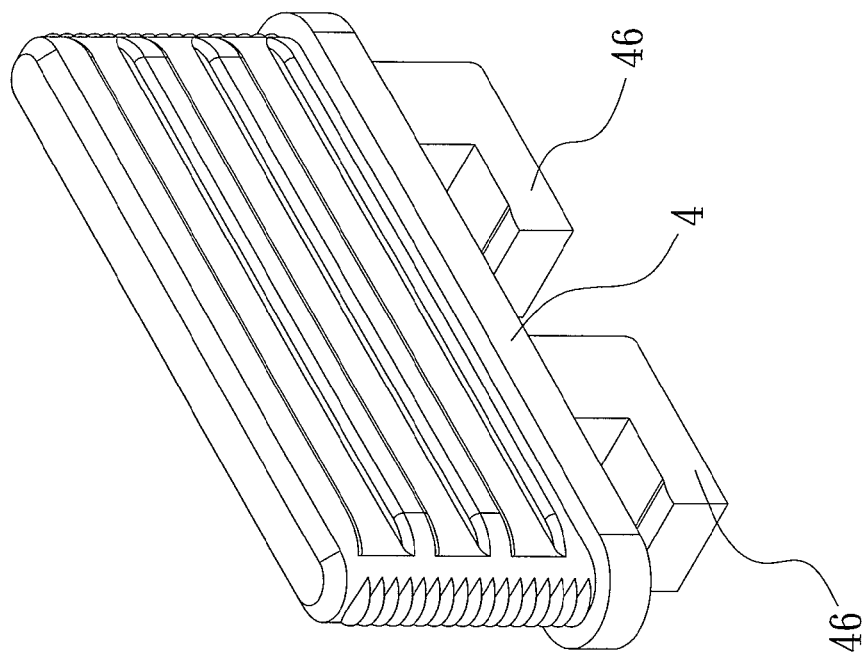
FIG. 14 is another perspective view showing the assembly of the retaining structure according to the third embodiment of the present invention.
Figure 13:
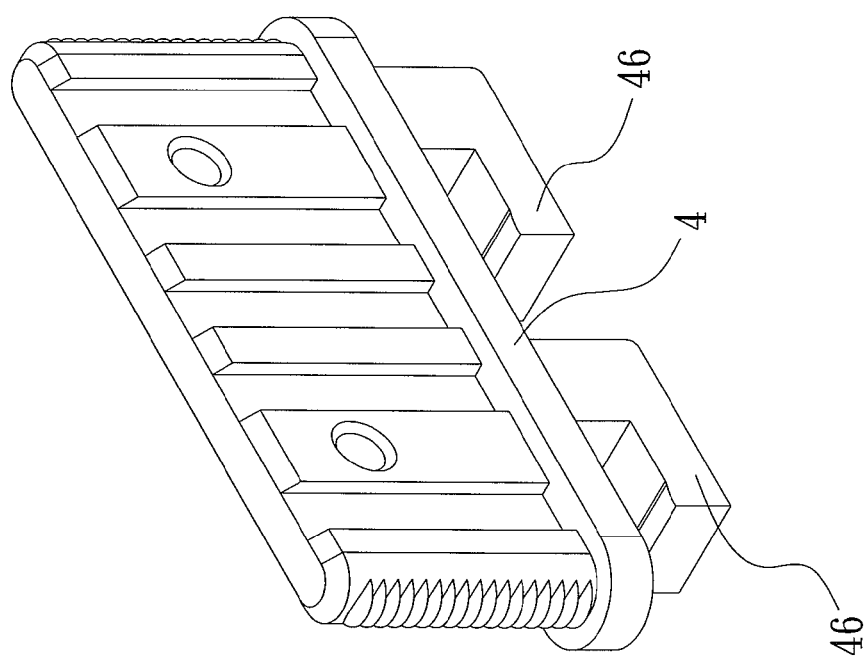
FIG. 13 is a perspective view showing the assembly of a retaining structure according to a third embodiment of the present invention.
Figure 15:
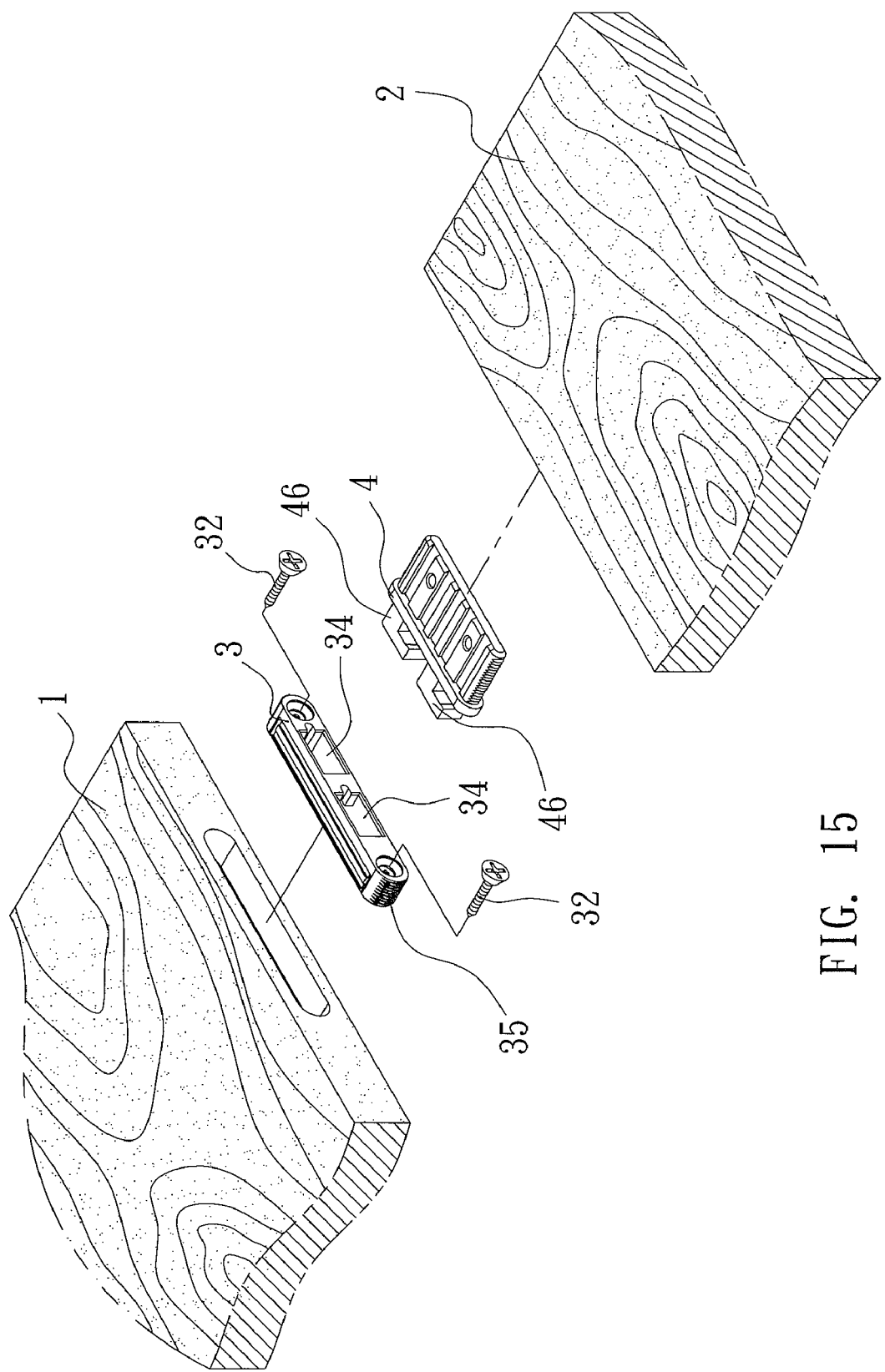
FIG. 15 is a perspective view showing the exploded components of the retaining structure according to the third embodiment of the present invention.

The fastening member 4 according to a third embodiment of the present invention is retained to grooves 34 of the retainer 3 (as shown in FIG. 15) and includes two L-shaped supports 46 extending outward therefrom (as shown in FIGS. 13 and 14) and having a L-shaped space between the two supports 46.

Figure 16:
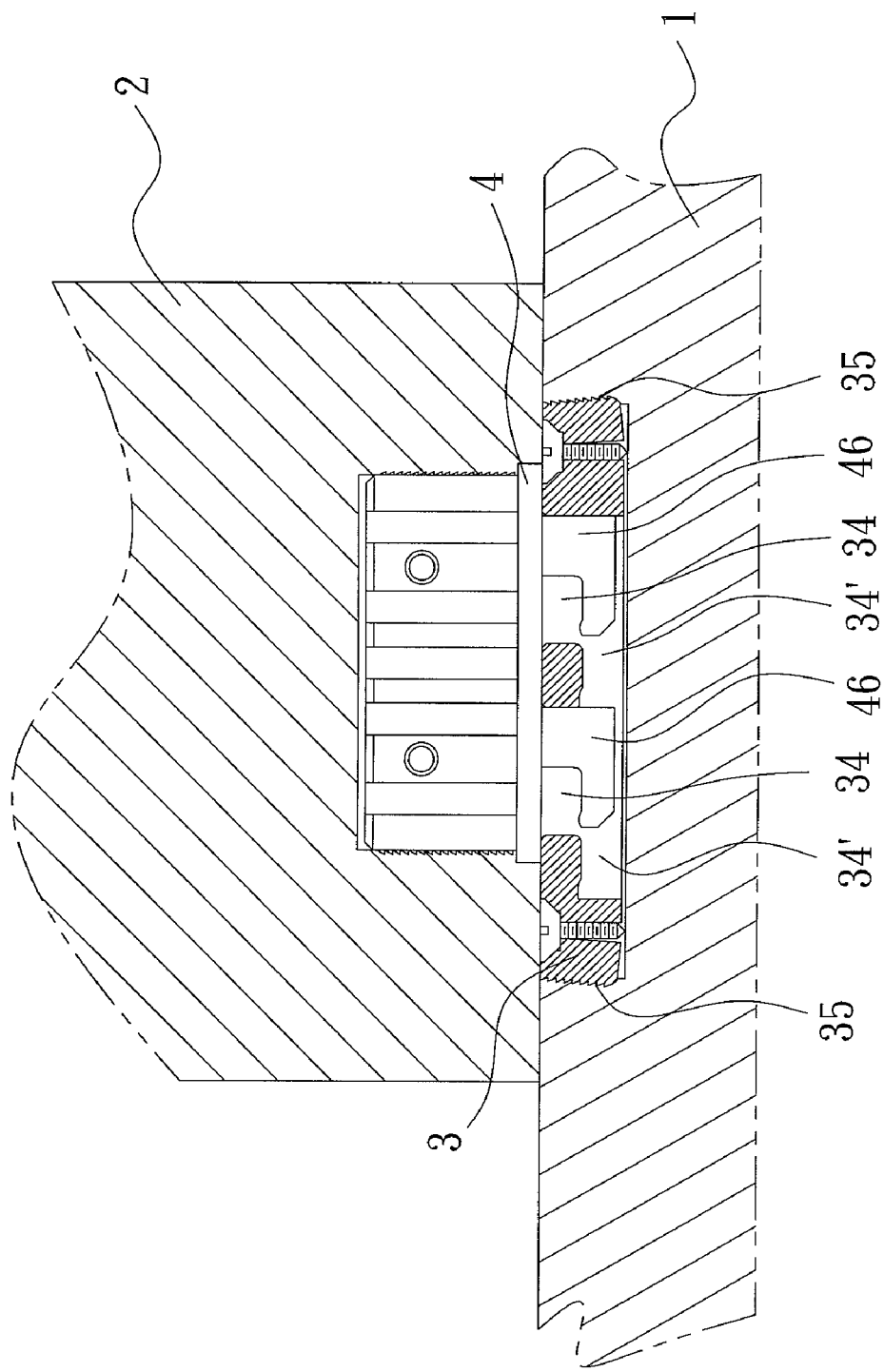
FIG. 16 is a cross sectional view showing the operation of the retaining structure according to the third embodiment of the present invention.
Figure 17:
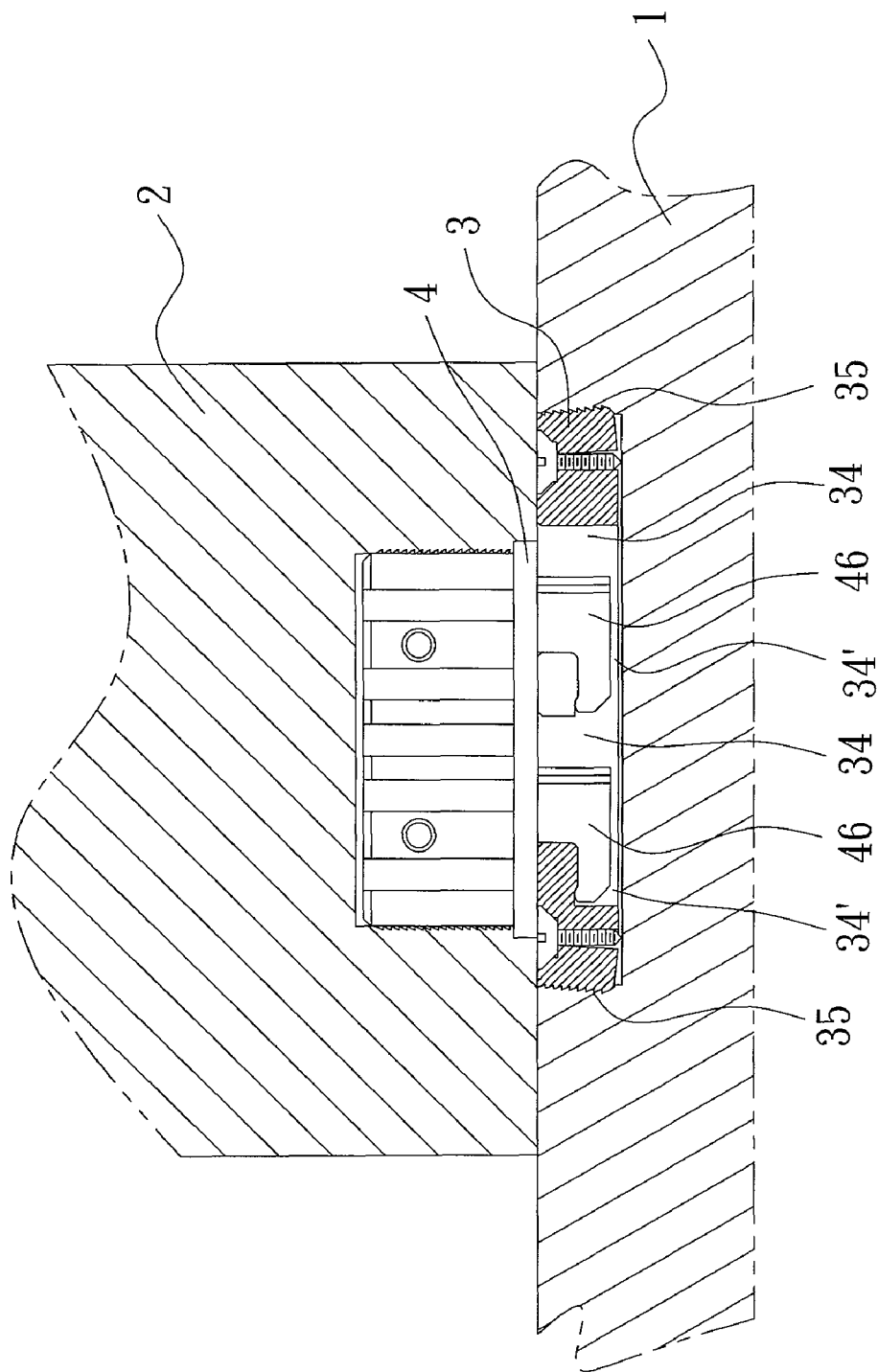
FIG. 17 is another cross sectional view showing the operation of the retaining structure according to the third embodiment of the present invention.

In operation, the acting end of the fastening member 4 is fastened to the second parts 2 (as illustrated in FIG. 16), and the supports 46 of the fastening member 4 are fitted to the grooves 34 of the retainer 3. Thereafter, the second part 2 is pushed to troughs 34' (as illustrated in FIG. 17) so that the supports 46 of the fastening member 4 are retained in the troughs 34' securely.

Figure 18:
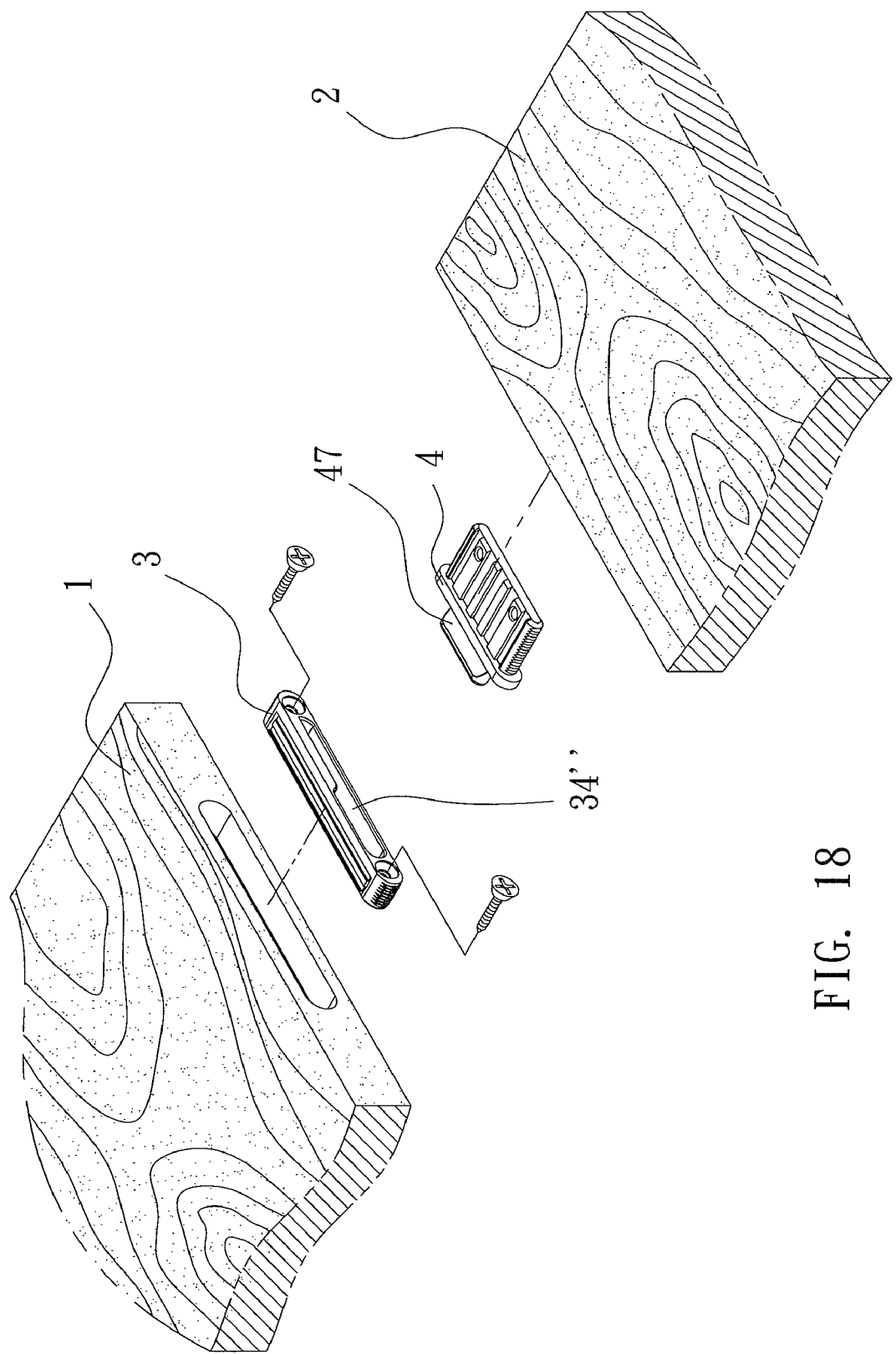
FIG. 18 is a perspective view showing the exploded components of the retaining structure according to a fourth embodiment of the present invention.

Besides, the fastening member 4 according to a fourth embodiment of the present invention includes a support 47 extending outward from one end thereof to be fitted to the groove 34" of the retainer 3 as shown in FIG. 18, and the support 47 has one laterally extended side parallel to the fastening member 4.

Figure 19:
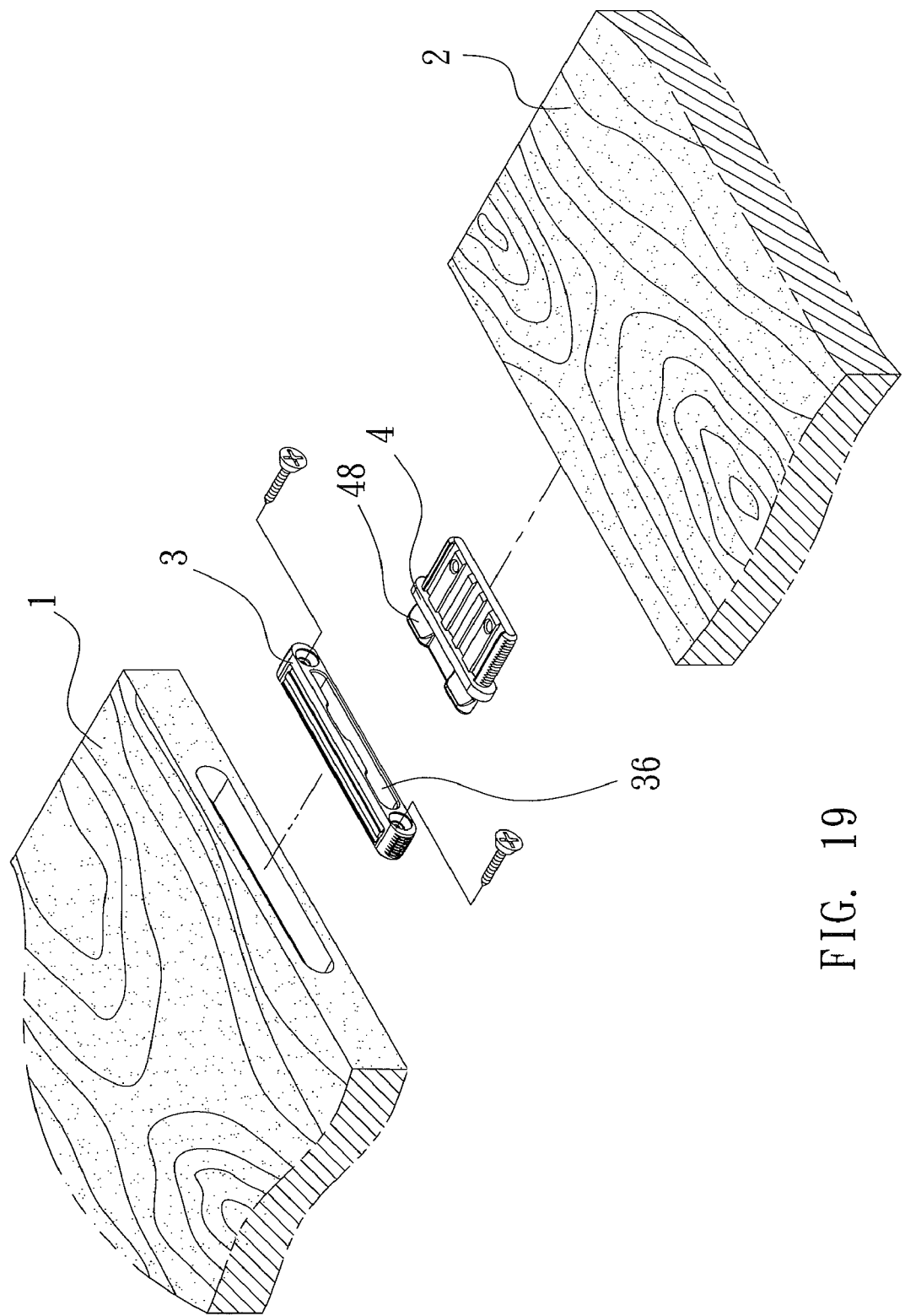
FIG. 19 is a perspective view showing the exploded components of the retaining structure according to a fifth embodiment of the present invention.

The fastening member 4 according to a fifth embodiment of the present invention includes a support 48 having two raised portions and a recessed section between the two raised portions as illustrated in FIG. 19. The support 48 is fitted to the groove 36 of the retainer 3.

Figure 20:
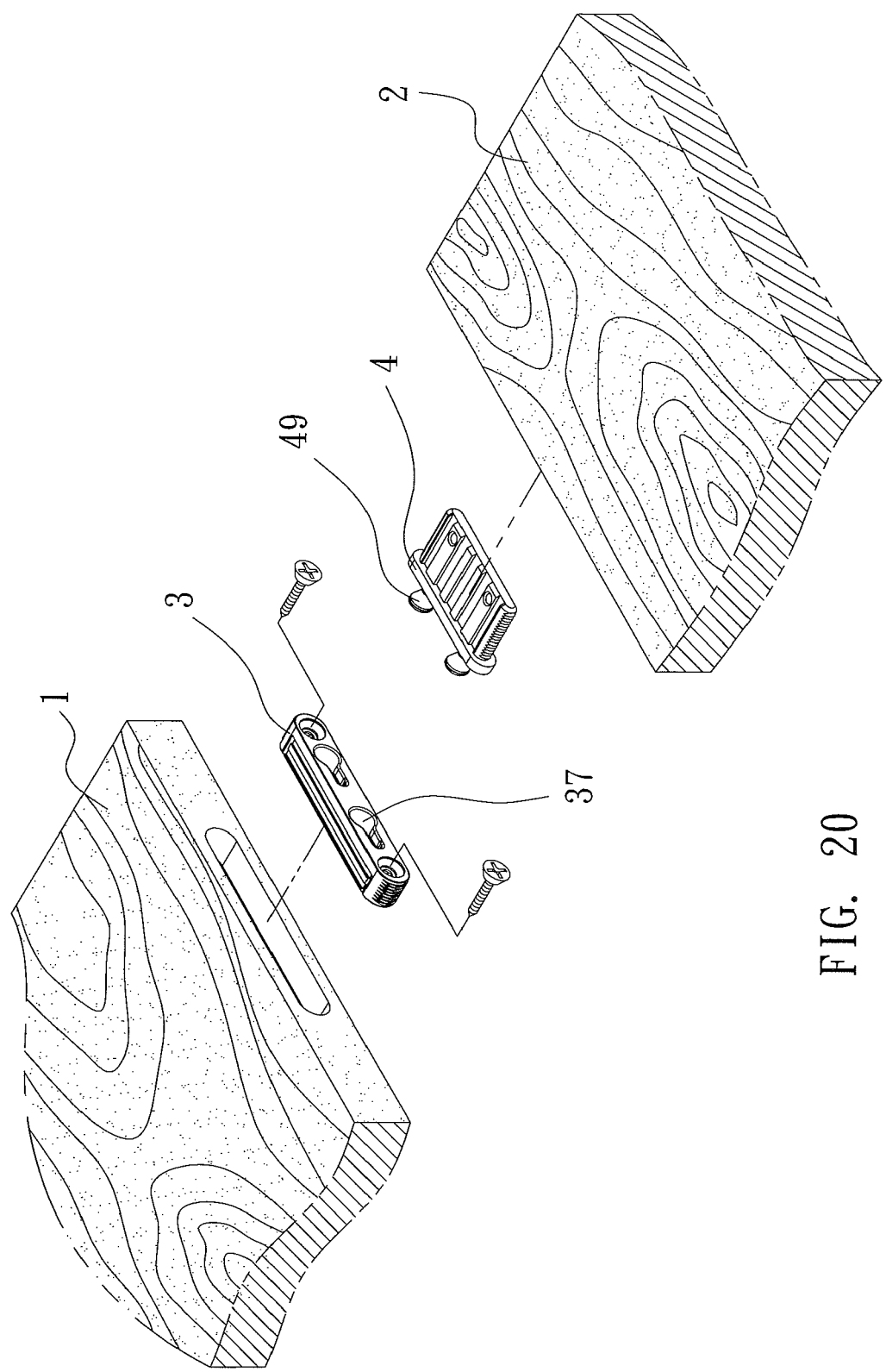
FIG. 20 is a perspective view showing the exploded components of the retaining structure according to a sixth embodiment of the present invention.

The fastening member 4 according to a sixth embodiment of the present invention includes two supports 49 between which a space is defined as illustrated in FIG. 20, so as to be fitted into two trenches 37 of the retainer 3 respectively.

While various embodiments in accordance with the present invention have been shown and described, it is clear to those skilled in the art that further embodiments may be made without departing from the scope of the present invention.

What is claimed is:

1. A retaining structure for connecting a wooden first part to a wooden second part, with the retaining structure comprising:
a retainer to be fitted to a recess of the wooden first part, with the retainer including a notch; and
a fastening member having a support portion and an acting end portion with first and second ends, with the support portion extending outward of the first end and removably fittable in the notch of the retainer, with the acting end portion being engageable to the wooden second part and further including first and second arcuate sides extending between the first and second ends, front and rear linear sides extending between the first and second arcuate sides and between the first and second ends, and a plurality of wings formed on each of the first and second arcuate sides of the acting end portion, with the plurality of wings extending between the front and rear linear sides and extending parallel to the first and second ends, wherein the acting end portion further includes a plurality of recessed portions on each of the front and rear linear sides and spaced apart from each other and a plurality of raised portions intermediate the plurality of recessed portions, with the plurality of wings being spaced from the plurality of recessed portions.

2. The retaining structure as claimed in claim 1, wherein the plurality of recessed and raised portions are arranged longitudinally on the front and rear linear sides of the acting end portion of the fastening member extending between the first and second ends.

3. The retaining structure as claimed in claim 1, wherein the plurality of recessed and raised portions are arranged horizontally on the front and rear linear sides of the acting end portion of the fastening member extending between the first and second arcuate sides.

4. The retaining structure of claim 1 wherein the retainer includes a first end, a second end, first and second arcuate sides extending between the first and second ends, and front and rear linear sides extending between the first and second arcuate sides and between the first and second ends, with the notch extending through the first end, with the retainer further including a plurality of wings formed on each of the first and second arcuate sides extending between the front and rear linear sides and extending parallel to the first and second ends, wherein the retainer further includes a plurality of recessed portions on each of the first and rear linear sides and spaced apart from each other and a plurality of raised portions intermediate the plurality of recessed portions, with the plurality of wings of the retainer being spaced from the plurality of recessed portions of the retainer.

5. The retaining structure of claim 4 further comprising first and second screw elements extending through the first and second ends of the retainer, with the notch located intermediate the first and second screw elements.

6. The retaining structure of claim 5 wherein the fastening member further includes another support portion extending outward of the first end, with a distance between the support portion and the other support portion.

7. The retaining structure of claim 6 wherein the support portion and the other support portion are each L-shaped in a direction between the first and second arcuate sides, with a L-shaped space defined between the support portion and the other support portion.

8. The retaining structure of claim 5 wherein the support portion is L-shaped.

9. The retaining structure of claim 8 wherein the support portion is L-shaped in a direction between the first and second arcuate sides.

10. The retaining structure of claim 8 wherein the support portion is L-shaped in a direction between the front and rear sides.

\* \* \* \* \*